July 5, 1949.  J. Z. MILLER  2,475,193
FISHING REEL AND ROD HOLDER
Filed Sept. 22, 1947
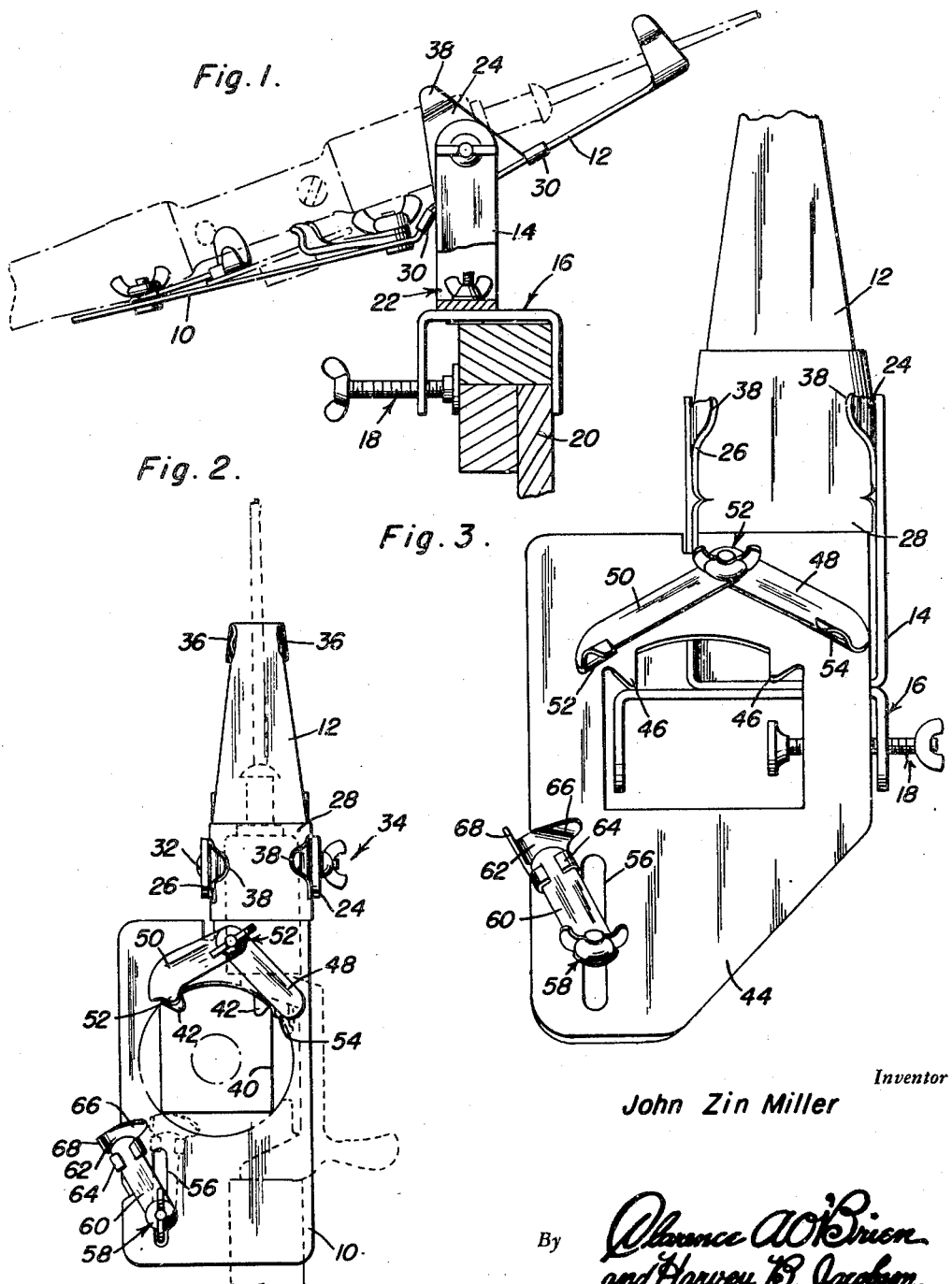
Inventor
John Zin Miller
By Clarence A. O'Brien
and Harvey B. Jacobson
Attorneys Patented July 5, 1949

2,475,193

UNITED STATES PATENT OFFICE 2,475,193

FISHING REEL AND ROD HOLDER

John Zin Miller, Hagerstown, Md., assignor to Abraham Jacobson, Hagerstown, Md.

Application September 22, 1947, Serial No. 775,426

5 Claims. (Cl. 248—42)

This invention appertains to novelty and improvements in rod and reel supporting means.

An object of this invention is to efficaciously and adjustably support a rod and reel during fishing operation, before, during and after the actual striking of a fish.

Another object of this invention is to provide means of a swivel character for supporting a base member, said base member having means for engaging in a locking position both the rod and reel.

Another purpose of this invention is to provide improved means for lockingly and adjustably retaining the reel portion of fishing gear.

Another purpose of this invention is to provide means for adjustably locking a rod and reel construction in selected pivoted position.

Another purpose of this invention is to provide an improved structure capable of carrying out all of the above mentioned functions as well as numerous ancillary functions, which is both simple in construction and relatively easy to produce.

Other objects and features of novelty will become apparent to those skilled in the art, in following the description of the preferred form of the present invention, illustrated in the accompanying drawings, wherein:

Figure 1 is an elevational side view of the preferred form of the present invention, showing its use with a fishing rod, reel and pertinent portion of a boat or the like;

Figure 2 is a plan view of the invention shown in Figure 1, and;

Figure 3 is an enlarged view of a slightly modified form of the invention.

This invention has been developed and is provided for the purpose of retaining fishing rods and reels of a particular type utilized in certain kinds of fishing operation. The fishing rod which is best adapted for use in conjunction with the present invention is the type having an offset portion for receiving a conventional reel therein.

By utility of the present invention, a rod and reel may be supported on a pertinent portion of a boat or other suitable anchor while the fisherman conducts his fishing operation in the position of an observer. The preferred embodiments of the present invention are so designed that immediately upon engagement with a fish, the rod and reel may be readily detached therefrom in order to land the fish.

A base 10 having an offset angularly inclined extension 12, is provided as the foundation of the device. Swivel anchoring means is associated with this base and extension. The preferable swivel means is composed of a substantially U-shaped bracket 14 pivoted to an inverted U-shaped bracket of C-clamp generally indicated at 16. Of course, the usual screw means 18 may be associated with the C-clamp member 16 for the obvious purpose of attachment to a suitable anchor 20. A wing nut construction 22 is supplied in the web of the clamp or bracket 14 and in the C-clamp body portion. This obviously permits swivel movement about the axis of the wing nut construction (bolt thereof). The legs of the U-shaped bracket 14 are pivotally associated with resilient clips 24 and 26 respectively. These clips are attached and form a portion of a small housing 28 which is secured to the extension 12 by means of inturned clips 30. In this pivotal association a small rivet or the like 32 may be utilized in conjunction with one leg of the U-shaped bracket 14 while a thumb screw construction 34 may be utilized in association with the other leg thereof. This obviously permits the base 10 and extension 12 to be retained in selected pivoted positions relative to the swivel securing means.

At the extremity of the said extension 12 there is provided a pair of resilient clips 36 for guide and anchoring purposes of a fish rod and the terminal portions of the said clips 24 may be incurved as at 38 for additional support of the fishing gear.

The base 10 is provided with an aperture 40 therein for accommodating a portion of a conventional reel. Small clips 42 may be associated with this aperture, extending therein for actual engagement with the said reel.

It is noted at this point that the second embodiment of the invention disclosed in Figure 3 differentiates in that the body portion 44 thereof has an angular cut-out at one end thereof and the clips 46 equivalent to the said clips or fingers 42, are in the plane of the said body member 44 and are so constructed as to be bendable for further accommodation of a reel.

Means for detachably locking this reel in the base 10 is provided. This means is preferably a pair of arms 48 and 50 respectively pivoted by a common pivot means, which is preferably a thumbscrew construction 52. Positioned on the marginal edges of the said arms 48 and 50 respectively is a pair of integral keepers 52 and 54 respectively which are preferably lips or extensions having arcuate bends therein.

Another adjustable clamping means is utilized in association with this invention. A slot 56 is provided in the bases 10 and 44 respectively, having a wing nut in both constructions, generally indicated at 58, associated therewith. An extensible link is secured to this wing nut construction 58 and is obviously adjustable in selected positions within the confines of the said slot 56. This extensible link is preferably a first member 60 pivotally associated with the thumbscrew construction 58 and an extensible member 52 associated therewith. This extensible member is preferably in the form of an arm having flanges 64 curved over the arm 60, frictionally binding the said extension 62 with the said arm 60. A keeper 66 in formed integral with the said extension 62 for engagement with a conventional reel. If desired, a thumb engaging flange 68 may be associated with the extensible member 62 for ease in operation.

While there has been described and illustrated but preferred forms of the invention, it is apparent that various changes, including omissions and additions may be made herein without departing from the spirit of the invention. Therefore, limitation is sought only in accordance with the scope of the appended claims.

Having described the invention what is claimed as new is:

1. In a rod and reel holder, a base having an offset angularly inclined extension, swivel anchoring means, means for frictionally engaging a rod pivotally associated with said anchoring means and attached to said extension, means for locking said extension and said swivel anchoring means in selected relative positions, means for detachably securing a rod and reel in said base, said detachably securing means including arms pivoted to said base having keepers thereon engageable with a reel, means for locking said arms in selected positions.

2. In a rod and reel holder, a base having an offset angularly inclined extension, swivel anchoring means, means for frictionally engaging a rod pivotally associated with said anchoring means and attached to said extension, means for locking said extension and said swivel anchoring means in selected relative positions, means for detachably securing a rod and reel in said base, said detachably securing means including arms pivoted to said base having keepers thereon engageable with a reel, means for locking said arms in selected positions, said rod frictional engaging means comprising a pair of resilient clips.

3. In a rod and reel holder, a base having an offset angularly inclined extension, swivel anchoring means, means for frictionally engaging a rod pivotally associated with said anchoring means and attached to said extension, means for locking said extension and said swivel anchoring means in selected relative positions, means for detachably securing a rod and reel in said base, said detachably securing means including a slot in said base, an extensible link selectively positioned in said slot having a keeper thereon.

4. In a rod and reel holder, a base having an offset angularly inclined extension, swivel anchoring means, means for frictionally engaging a rod pivotally associated with said anchoring means and attached to said extension, means for locking said extension and said swivel anchoring means in selected relative positions, means for detachably securing a rod and reel in said base, said detachably securing means including arms pivoted to said base having keepers thereon engageable with a reel, means for locking said arms in selected positions, a slot in said base, an extensible link selectively positioned in said slot having a keeper thereon.

5. In a rod and reel holder, a base having an offset angularly inclined extension, swivel anchoring means, means for frictionally engaging a rod pivotally associated with said anchoring means and attached to said extension, means for locking said extension and said swivel anchoring means in selected relative positions, means for detachably securing a rod and reel in said base, said detachably securing means including arms pivoted to said base having keepers thereon engageable with a reel, means for locking said arms in selected positions, a slot in said base, an extensible link selectively positioned in said slot having a keeper thereon, an aperture in said base for accommodating a portion of a reel and said rod frictional engaging means including a pair of resilient clips.

JOHN ZIN MILLER.

REFERENCES CITED

The following references are of record in the file of this patent:

UNITED STATES PATENTS

| Number | Name | Date |
| --- | --- | --- |
| 2,143,109 | Hadaway | Jan. 10, 1939 |
| 2,311,823 | Gaskill | Feb. 23, 1943 |